US007136902B1

(12) United States Patent
Ruckart

(10) Patent No.: US 7,136,902 B1
(45) Date of Patent: Nov. 14, 2006

(54) SYSTEMS AND METHODS FOR FORWARDING TEXT, VOICE, AND DATA IN A TELECOMMUNICATIONS NETWORK

(75) Inventor: John P. Ruckart, Atlanta, GA (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 744 days.

(21) Appl. No.: 10/155,303

(22) Filed: May 24, 2002

(51) Int. Cl.
*G06F 15/16* (2006.01)
(52) U.S. Cl. .................. 709/206; 709/203; 709/204; 709/205; 709/217; 709/218; 715/752
(58) Field of Classification Search ............... 709/200, 709/203, 204, 205, 206, 218; 455/457, 557
See application file for complete search history.

(56) References Cited

U.S. PATENT DOCUMENTS 5,438,568 A  8/1995  Weisser, Jr.
6,317,594 B1 *  11/2001  Gossman et al. ........ 455/414.1
6,442,595 B1 *  8/2002  Kelly ......................... 709/206
6,907,112 B1 *  6/2005  Guedalia et al. ......... 379/88.17

OTHER PUBLICATIONS

Newton, "Newton's Telecom Dictionary," Mar. 2005, CMP Books, 21st ed., p. 678.*

* cited by examiner

*Primary Examiner*—Yves Dalencourt
(74) *Attorney, Agent, or Firm*—Thomas, Kayden, Horstemeyer & Risley LLP

(57) ABSTRACT

A method for sending a message from a telecommunications device to a receiving device. The method includes recording the message as an audio file, receiving an address of the receiving device, and sending the audio file as an attachment to an electronic mail message to the receiving device.

21 Claims, 4 Drawing Sheets

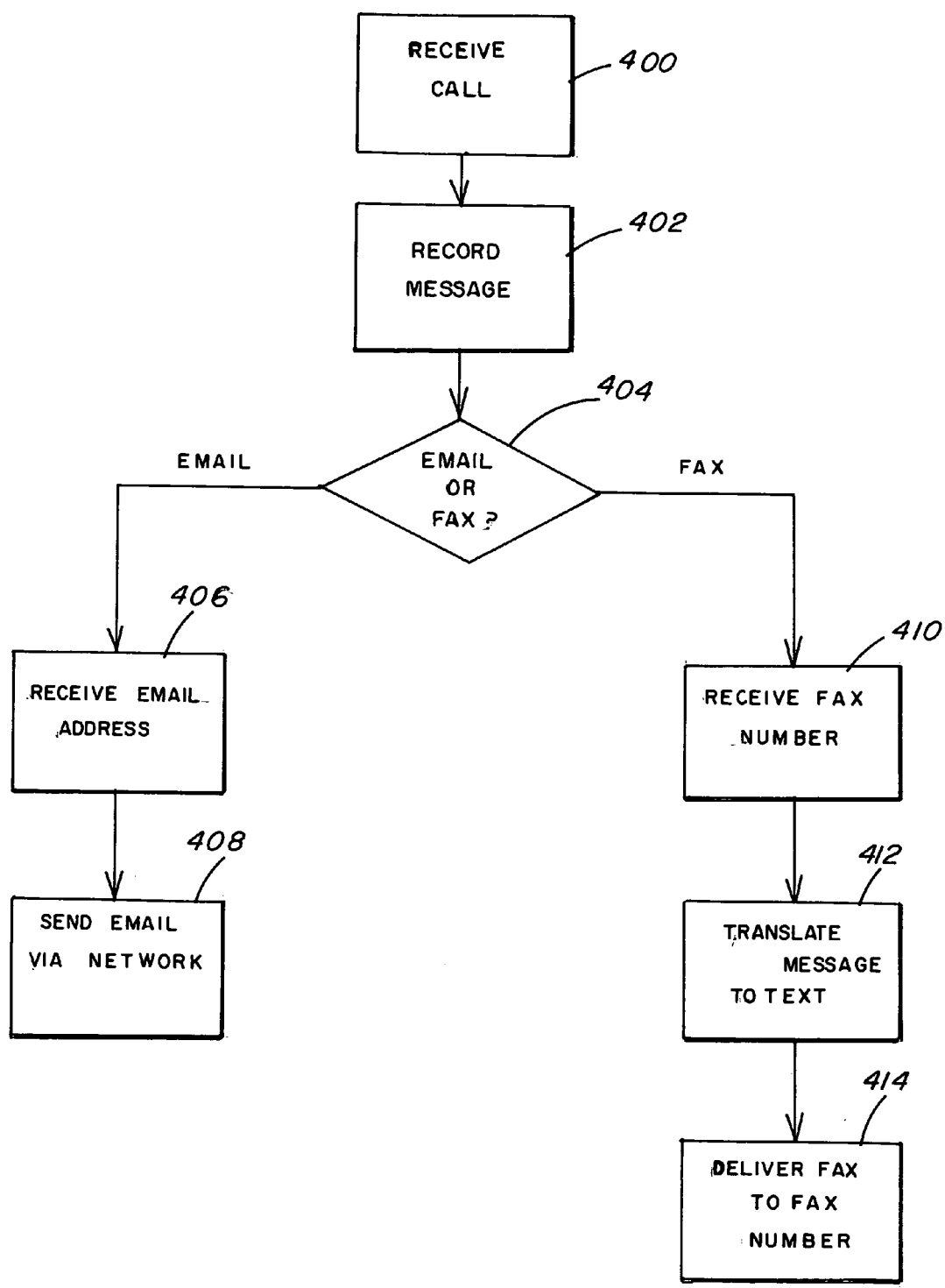

SYSTEMS AND METHODS FOR FORWARDING TEXT, VOICE, AND DATA IN A TELECOMMUNICATIONS NETWORK

BACKGROUND

As both wireline and wireless telecommunications devices become increasingly prevalent, many people desire to use their devices to communicate with other devices that may not be connected to a telecommunications system or may not be capable of performing traditional telecommunications functions such as receiving a voice telephone call. Thus, a person using, for example, a wireless telephone may not be able to converse or communicate with the user of a personal computer unless the user of the telephone communicates with the user of the personal computer using text only messages or electronic mail. Utilizing such text message or electronic mail capabilities may be cumbersome when using certain types of devices (e.g. a cellular telephone) that do not have advanced text or electronic mail capabilities. Such devices may make composing a text message or electronic mail cumbersome due to the lack of a conventional entry device such as a conventional QWERTY keyboard. Thus, there is a need for a device that allows users of a telecommunications device to more easily communicate with devices that may not be equipped to handle telecommunications functions such as voice telephone calls and facsimile transmissions.

SUMMARY

In one embodiment, the present invention is directed to a method for sending a message from a telecommunications device to a receiving device. The method includes recording the message as an audio file, receiving an address of the receiving device, and sending the audio file as an attachment to an electronic mail message to the receiving device.

In one embodiment, the present invention is directed to a method for sending a message from a telecommunications device to a receiving device. The method includes recording the message, receiving a telephone number of the receiving device, and sending the message as a facsimile message to the receiving device.

In one embodiment, the present invention is directed to a telecommunications network server. The server is configured to receive an audio message from a telecommunications device, receive an address of a receiving device from the telecommunications device, and transmit the message as an audio file attachment to an electronic mail to the receiving device.

In one embodiment, the present invention is directed to a telecommunications network server. The server is configured to receive a text message from a telecommunications device, receive a telephone number of a receiving device from the telecommunications device, and transmit the message as a facsimile message to the receiving device.

BRIEF DESCRIPTION OF THE DRAWINGS

Further advantages of the present invention may be better understood by referring to the following description taken in conjunction with the accompanying drawings, in which:

FIG. 4 is a block diagram of a process flow through the system of FIG. 2 according to one embodiment of the present invention.

DESCRIPTION

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these and other elements may be desirable. However, because such elements are well known in the art, and because they do not facilitate a better understanding of the present invention, a discussion of such elements is not provided herein.

The terms "calling party" and "user" are used herein generally to refer to the person or unit that initiates a telecommunication. The calling party may also be referred to herein as "caller." In some cases, the calling party may not be a person, but may be a device such as a facsimile machine, an answering service, a modem, etc. The term "called party" is used herein generally to refer to the person or unit that answers or responds to the call or communication. The term "communication" is used herein to include all messages or calls that may be exchanged between a calling party and a called party, including voice, data, facsimile and video messages. The term "communication" is used synonymously herein with the term "call" unless a distinction is noted. The term "subscriber" is used herein to generally refer to a subscriber of the described telecommunications service.

The present invention, in various embodiments, relates to sending messages from a telecommunications device to, for example, a personal computer or a facsimile machine. The messages can be, for example, electronic mail messages having audio file attachments or text transcriptions or translations of spoken input (e.g. to be delivered to a facsimile machine). The user (e.g. a subscriber of the services described herein) of the telecommunications device can create the audio file attachments by, for example, recording the audio messages or by entering the messages via a keypad or keyboard.

According to one embodiment, the system of the present invention utilizes the intelligent functionality of an Advanced Intelligent Network (AIN). The AIN is a network used in conjunction with a conventional telephone network, such as the public switched telephone network (PSTN), to provide enhanced voice and data services and dynamic routing capabilities using two different networks. The actual voice call is transmitted over a circuit-switched network, but the signaling is done on a separate packet-switched network. Before describing details of the system of the present invention, a description of the AIN is provided.

Figure 1:
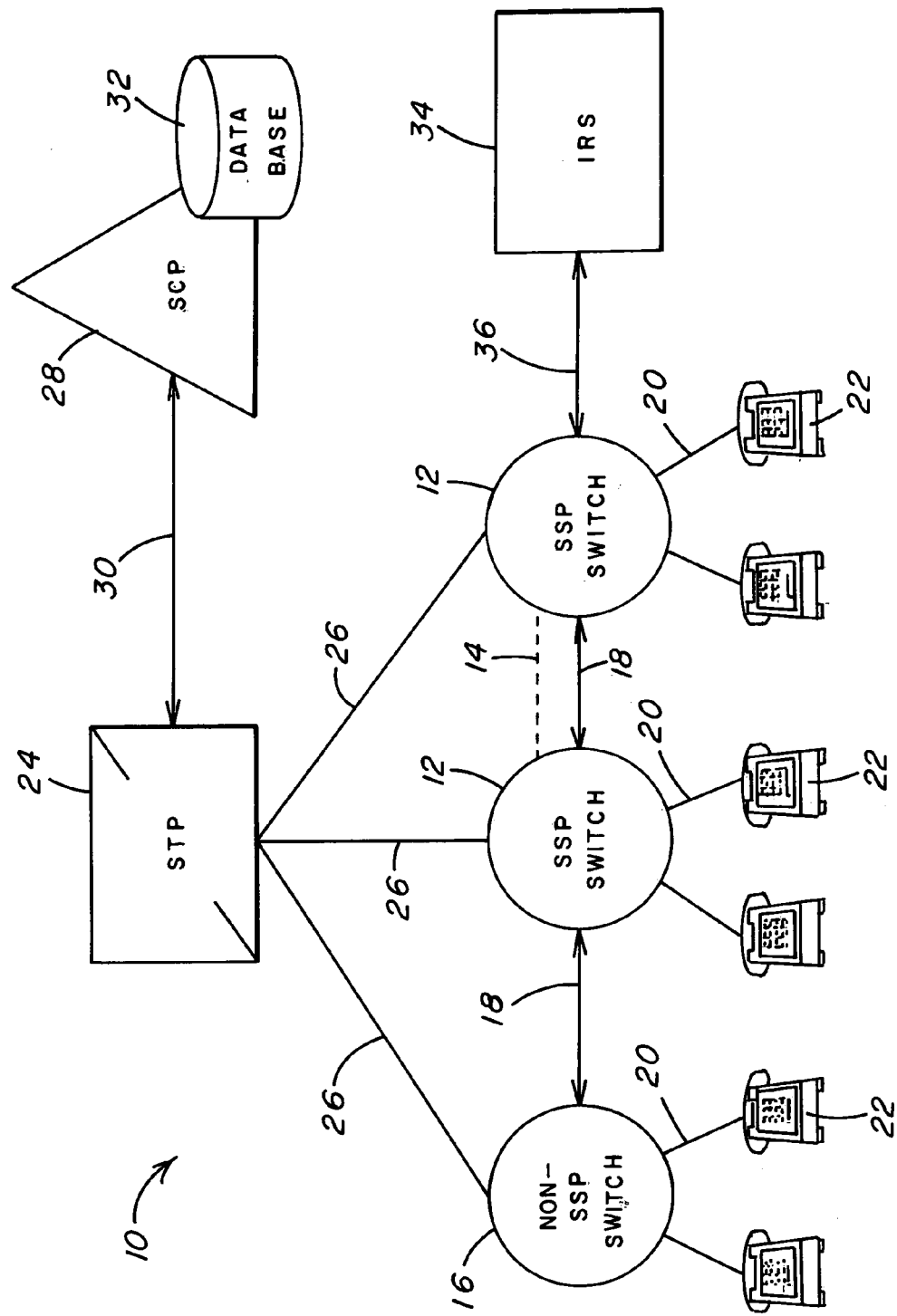
FIG. 1 is a diagram illustrating an Advanced Intelligent Network (AIN) for integration with the public switched telephone network (PSTN) according to one embodiment of the present invention.

FIG. 1 is a block diagram of an Advanced Intelligent Network (AIN) 10 for integration with the public switched telephone network (PSTN). The AIN 10 may be employed by a Local Exchange Carrier (LEC), and may be utilized by the LEC to allow the LEC to provide call processing features and services that are not embedded within conventional switching circuits of the PSTN.

A typical LEC includes a number of central office (CO) switches for interconnecting customer premises terminating equipment with the PSTN. For an LEC including the AIN 10 as illustrated in FIG. 1, the central office switches may be provided as Service Switching Points (SSP) switches 12. The dashed line 14 between the SSP switches 12 indicates that the number of SSP switches 12 in the AIN 10 may vary depending on the particular requirements of the AIN 10. The AIN 10 may also include a non-SSP switch 16. The difference between the SSP switches 12 and the non-SSP switch 16 is that the SSP switches 12 provide intelligent network functionality. Interconnecting the SSP switches 12 and the non-SSP switch 16 are communication links 18 which may be, for example, trunk circuits.

Each SSP switch 12 and non-SSP switch 16 has a number of subscriber lines 20 connected thereto. The subscriber lines 20 may be, for example, conventional twisted pair loop circuits connected between the switches 12, 16 and the telephone drops for the customer premises, or the subscriber lines 20 may be trunk circuits, such as T-1 trunk circuits. The number of subscriber lines 20 connected to each switch 12, 16 may be on the order of ten thousand to one hundred thousand lines. Each of the subscriber lines 20 is connected to a terminating piece of customer premises equipment, represented in FIG. 1 by the landline telephones 22. Alternatively, the terminating equipment may be other types of telecommunications units such as, for example, a telecopier, a personal computer, a modem, or a private branch exchange (PBX) switching system.

For the AIN 10 illustrated in FIG. 1, each SSP switch 12 and the non-SSP switch 16 are connected to a signal transfer point (STP) 24 via a communication link 26. The communication link 26 may employ, for example, the SS7 switching protocol. The STP 24 may be a multi-port high speed packet switch that is programmed to respond to the routing information in the appropriate layer of the switching protocol, and route the data packets to their intended destination.

One of the intended destinations of the data packets from the STP 24 is a service control point (SCP) 28. The STP 24 is in communication with the SCP 28 via a communication link 30, which may also employ the SS7 switching protocol. The SCP 28 may be an intelligent database server such as, for example, an Intelligent Network Service Control Point available from Lucent Technologies Inc., Murray Hill, N.J., and may have associated with it a network database 32 for storing network data. The intelligent functionality of the SCP 28 may be realized by application programs, such as programmable Service Program Applications (SPA), which are run by the SCP 28. The SCP 28 may be employed to implement high volume routing services, such as call forwarding and number portability translation and routing. In addition, another of the functions of the SCP 28 is hosting of the network database 32, which may store subscriber information, such as subscriber call management profiles, used in providing enhanced calling services.

The AIN 10 illustrated in FIG. 1 also includes an intelligent resource server (IRS) 34. The IRS 34 may be, for example, a Compact Services Node (CSN) available from Lucent Technologies Inc., Murray Hill, N.J., although the IRS 34 may be any other type of available AIN-compliant SN. The IRS 34 may be connected to one or more of the SSP switches 12 via a communications link 36 which may be, for example, an Integrated Service Digital Network (ISDN), including BRI (Basic Rate Interface) or PRI (Primary Rate Interface) lines. According to other embodiments, the communications link 36 may be, for example, a T-1 trunk circuit.

The IRS 34 may include an enunciator and may be used when some enhanced feature or service is needed that requires an audio connection to the call such as, for example, the call return and calling name services. Similar to the SCP 28, the intelligent functionality of the IRS 34 may be realized by programmable applications executable by the IRS 34.

In order to keep the processing of data and calls as simple as possible at the switches, such as at the SSP switches 12, a set of triggers may be defined at the SSP switches 12 for each call. A trigger in an AIN is an event associated with a particular subscriber line 20 that generates a data packet to be sent from the SSP switch 12 servicing the particular subscriber line 20 to the SCP 28 via the STP 24. The triggers may be originating triggers for calls originating from the subscriber premises or terminating triggers for calls terminating at the subscriber premises. A trigger causes a message in the form of a query to be sent from the SSP switch 12 to the SCP 28.

The SCP 28 in turn interrogates the database 32 to determine whether some customized call feature or enhanced service should be implemented for the particular call, or whether conventional dial-up telephone service should be provided. The results of the database inquiry are sent back from the SCP 28 to the SSP switch 12 via the STP 24. The return packet includes instructions to the SSP switch 12 as to how to process the call. The instructions may be to take some special action as a result of a customized calling service or enhanced feature. For example, for an enhanced calling feature requiring the capabilities of the SN 34, the return message from the SCP 28 may include instructions for the SSP switch 12 to route the call to the IRS 34. In addition, the return message from the SCP 28 may simply be an indication that there is no entry in the database 32 that indicates anything other than conventional telephone service should be provided for the call. The query and return messages may be formatted, for example, according to conventional SS7 TCAP (Transaction Capabilities Application Part) formats. U.S. Pat. No. 5,438,568, which is incorporated herein by reference, discloses additional details regarding the functioning of an AIN.

The AIN 10 illustrated in FIG. 1 includes only one STP 24, one SCP 28, one network database 32, and one IRS 34, although the AIN 10 may further include an additional number of these components as well as other network components which not are included in FIG. 1 for purposes of clarity. For example, the AIN 10 may additionally include redundant SCPs and STPs to take over if the STP 24 or the SCP 28 should fail. In addition, the AIN 10 may include an Automatic Electronic Switching System (AESS) Network Access Point (NAP) in communication with the STP 24, which may be programmed to detect the trigger conditions. Further, the AIN 10 may include regional STPs and regional SCPs in communication with, for example, the local STP 24, for routing and servicing calls between different LECs.

Figure 2:
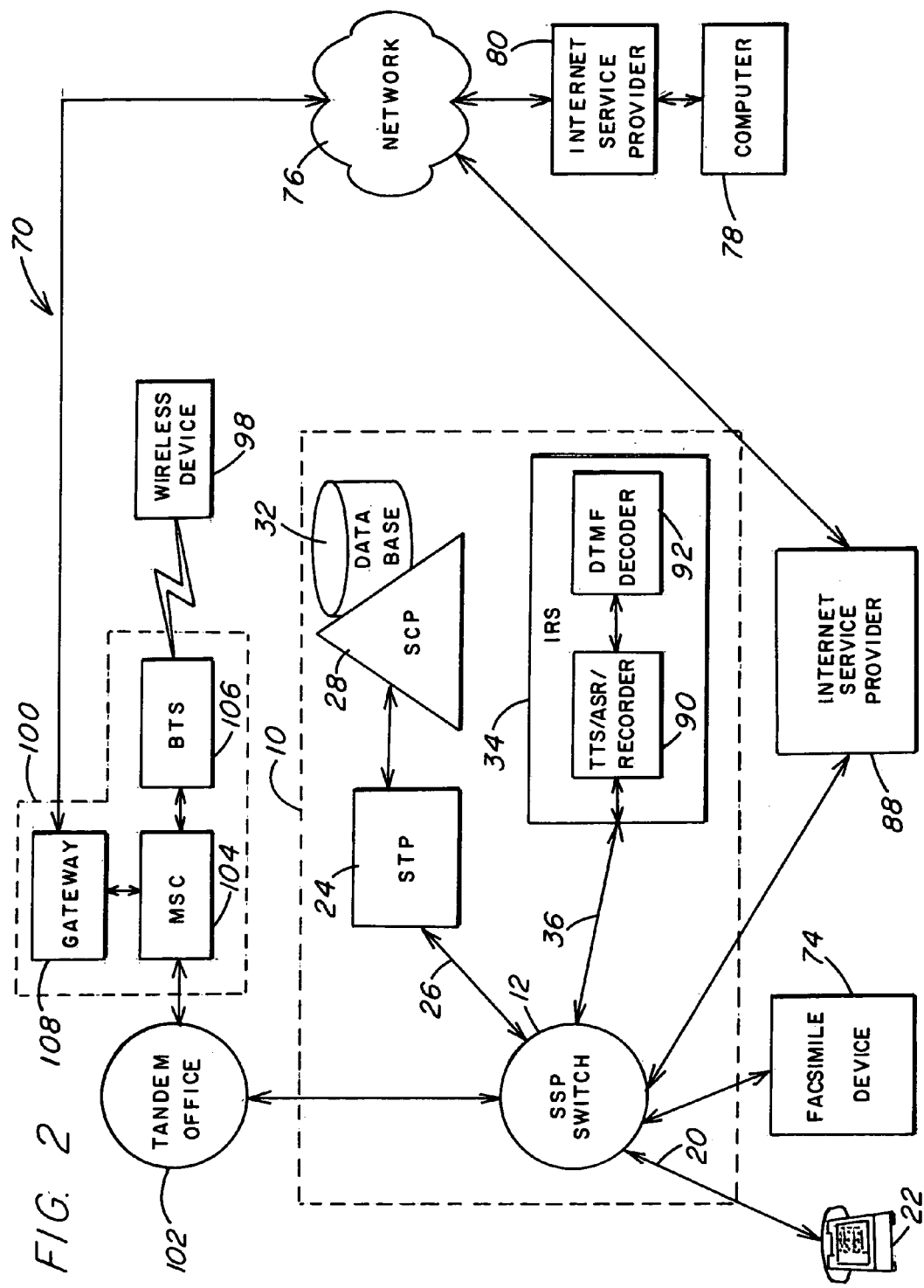
FIG. 2 is a diagram illustrating a network for providing a user of a telecommunications device the ability to send messages according to various embodiments of the present invention.

FIG. 2 is a diagram illustrating a network 70 for providing a user of a telecommunications device the ability to send messages according to various embodiments of the present invention. The network 70 includes portions of the AIN 10 illustrated in FIG. 1, including the SSP switch 12, the STP 24, the SCP 28, and the IRS 34. The customer premises terminating equipment are illustrated in FIG. 2 as the telephone 22 and a facsimile device 74, which are connected to the SSP switch 12 of the AIN 10 via subscriber lines 20. The facsimile device 74 may be, for example, a conventional facsimile machine or a computer with a facsimile modem. The customer premises terminating equipment may also be, for example, a modem, a personal computer, or a PBX.

According to one embodiment of the present invention, the AIN 10 is in communication with a network 76. The network 76 may be, for example, in communication with the Internet or an intranet via, for example, an Internet service provider (ISP) 88. The AIN 10 could also be in communication with the network 76 via, for example, a gateway such as the IRS 34 or another services node. A computer 78 such as, for example, a personal computer or a personal digital assistant (PDA), is in communication with the network 76. The computer 78 may access the network using, for example, a second ISP 80.

According to one embodiment of the present invention, a user of the device 22 may record a message for delivery to the computer 78. In one embodiment, to record a message for delivery, the user of the device 22 records the message on the device 22 using, for example, an audio recorder such as a memo recorder located on the device 22. Alternatively, the user of the device 22 may enter the message as a text message using, for example, a keypad and the message is converted, using a TTS converter, to an audio message. In another embodiment, to record a message for delivery, the user of the device 22 may dial a certain administration telephone number. This number may cause the SSP switch 12 to send a TCAP message to the SCP 28 in response to an originating trigger. The SCP 28 may recognize the number as the number to record a message, and return a TCAP message to the SSP switch 12 to route the call with an instructional message to the IRS 34. The instructional message may include the phone number of the party placing the call (i.e., the number for the subscriber line 20).

To permit the user of the device 22 to record an audio message, the IRS 34 may include an audio-based interface interpreter 90 having text-to-speech (TTS) translation, automatic speech recognition (ASR), and voice recording/digital encoding capabilities. The TTS, ASR, and recording/encoding capabilities of the interpreter 90 may be realized by software executable by the IRS 34. In one embodiment, the user of the device 22 may record a message using the interpreter 90. The message is recorded by the interpreter 90 and encoded into a digital file in a format such as, for example, the .wav format. The digital audio file may then be attached to an electronic mail message to be delivered to the computer 78. In another embodiment, the user of the device 22 speaks the message, which is converted into text for delivery to the facsimile device 74 or the computer 78.

In one embodiment, after recording the message, the user speaks an address, such as a URL address, for the computer 78 or the user speaks a facsimile number of the facsimile device 74 and the IRS 34, using its ASR capabilities, provides the SSP switch 12 with the correct routing of the message (e.g. either to the device 74 or the computer 78).

The IRS 34 may also include a DTMF decoder 92. The DTMF decoder 92 may be programmed to recognize the dialing of certain digits or characters of, for example, a touch-tone telephone. In one embodiment, the user of the device 22 may input a telephone number associated with the facsimile device 74 or an address of the computer 78 using a touch-tone keypad on the device 22. In one embodiment, the user of the device 22 may input the message that is to be sent to the device 74 or the computer 78 via a touch-tone keypad on the device 22 and, in the case of a message sent to the computer 78, the message is converted to a digital audio file using the TTS converter capability of the interpreter 90.

Embodiments of the communications network 70 of the present invention also permit a wireless device user to send messages or electronic mail (e.g. an electronic mail message with an audio file attachment) to the facsimile device 74 or the computer 78. A wireless device 98, such as a wireless telephone, is in communication with the SSP switch 12 of the AIN 10.

The wireless device 98 may be in communication with the SSP switch 12 via a wireless network 100 and a tandem office 102. The wireless network 100 may include, for example, a Mobile Switching Center (MSC) 104, a base transceiver station (BTS) 106, and a gateway 108. The wireless device 98 may communicate with the BTS 106 via a radio communications link according to an air-interface communications scheme such as, for example, CDMA, TDMA, or GSM. The BTS 106 may communicate with the MSC 104 by, for example, an SS7 switching trunk network or an ISDN. The MSC 104 may be in communication with the SSP switch 12 of the AIN 10 via the tandem office 102. The gateway 108 may be any type of gateway or server that allows the wireless network 100 to interface with the network 76 such as, for example, a wireless application protocol (WAP) proxy server, a WAP gateway, or an uplink server.

In one embodiment, the user of the wireless device 98 may dial a telephone number to access the IRS 34. The recording and delivery of the message that is recorded or entered by the user of the device 98 is then handled as described hereinabove when the message is recorded or entered by the device 22.

In another embodiment, the message may be recorded using a recording capability of the device 98. Such a recording device may include, for example, a memo recorder device that is provided as part of a cellular telephone. Alternatively, a text message may be input to the device 98 and the device 98 may convert the message to, for example, a digital audio file using a TTS converter. The user may also enter a telephone number for the facsimile device 74 in the case of a facsimile delivery or an address for the computer 78 in the case of electronic mail delivery of the message using, for example, a keypad on the device 98 or by speaking the number or address, which is then converted to a telephone number or address using an ASR device on the device 98. In the case of an electronic mail message with a digital voice file as an attachment, the message may be sent by the gateway 108 to the computer 78 via the network 76. In the case of a facsimile message, the message may be delivered to the facsimile device 74 via the tandem office 102 and the AIN 10.

Similarly, in another embodiment, the user of the device 98 may record the audio message on an audio recorder located on the gateway 108. Alternatively, the user may enter the message as a text message that is converted to a digital audio file using a TTS converter located on the gateway 108. The message is then attached to an email and sent to an address of the computer 78 via the network 76. The address of the computer 76 may be obtained by way of the gateway 108 prompting for the address and the user of the device 98 entering the address using, for example, a keypad on the device 98 or by speaking the address. If the message is to be delivered to the facsimile device 74, the gateway 108 may encode the digital voice message into a text message for facsimile delivery or, in the case of a text message input by the user of the device 98, the gateway 108 may format the message into a facsimile format. In either case, the message is delivered via the tandem office 102 and the AIN 10 to the facsimile device 74.

Figure 3:
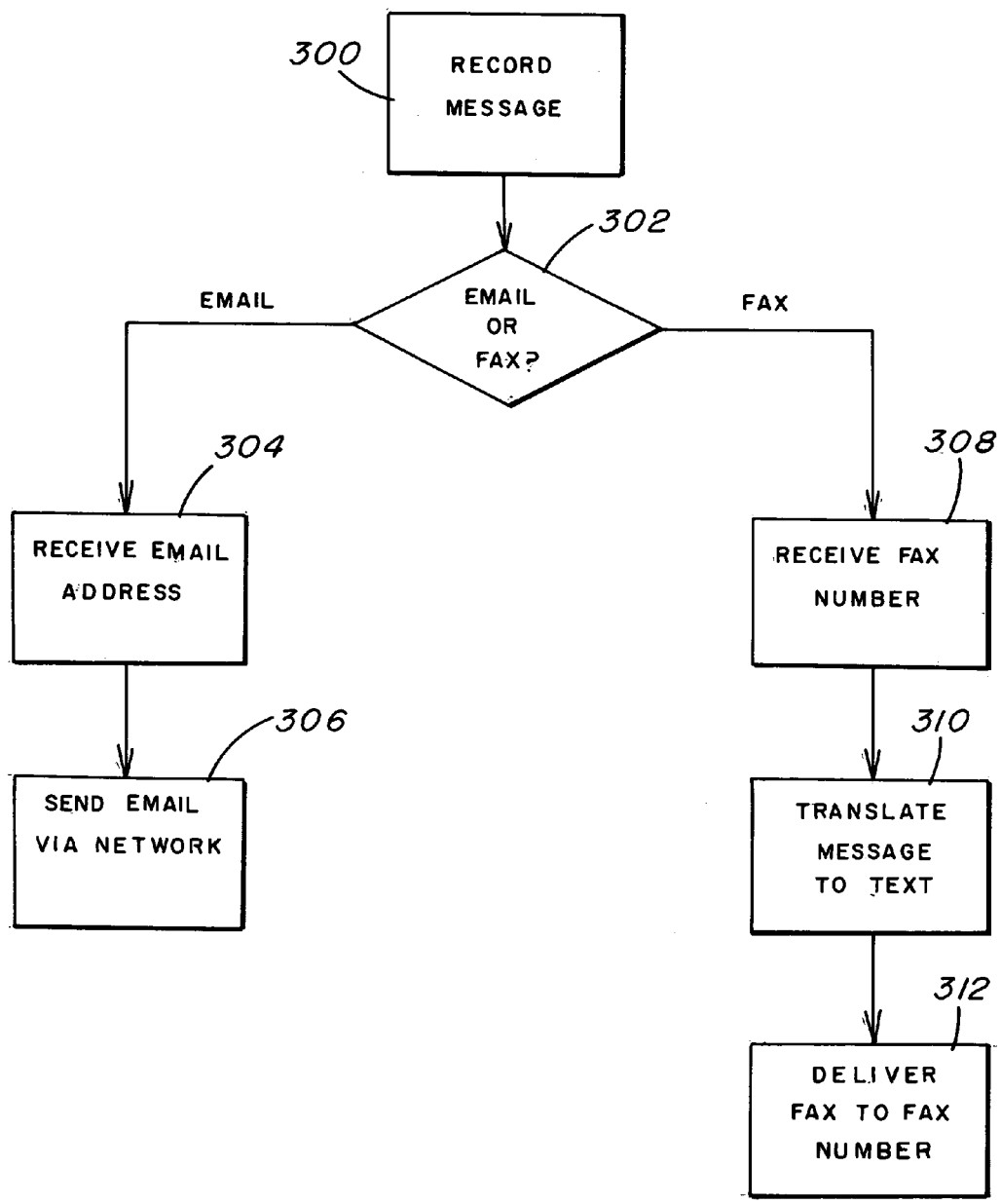
FIG. 3 is a block diagram of a process flow through the system of FIG. 2 according to one embodiment of the present invention.

FIG. 3 is a block diagram of a process flow through the system 70 of FIG. 2 according to one embodiment of the present invention. In the embodiment shown in FIG. 3, the user of either the device 22 or the device 98 desires to send either a digital audio message as an attachment to an electronic mail message to the computer 78 or desires to send a facsimile message to the facsimile device 74. In the embodiment shown in FIG. 3, the device that is used to compose the message (i.e. either the device 22 or the device 98) has the capability to record messages (e.g. the device 22, 98 has a voice recorder).

At step 300, the user of the device 22, 98 records the message using the device 22, 98. Alternatively, the user enters the message as a text message using, for example, a keypad, and the text message may be converted to a digital audio format using, for example, a TTS converter. At step 302, the user is prompted as to whether the message will be sent as an attachment to an electronic mail message or as a facsimile message. If the message is to be sent as an attachment to an electronic mail message, at step 304 the user of the device 22, 98 enters the address for the device to which the message will be sent. The user may enter the address using, for example, a keypad on the device 22, 98 or by speaking the address. At step 306, the electronic mail message is sent via the network 76 by the gateway 108 or by the AIN 10.

If the message is to be sent to the facsimile device 74, the user enters the telephone number of the device 74 using, for example, a keypad on the device 22, 98 or by speaking the telephone number at step 308. At step 310, the message is translated to a text message using an ASR device if it was recorded in digital audio format. At step 312 the facsimile message is delivered to the facsimile device 74 via the AIN 10.

FIG. 4 is a block diagram of a process flow through the system 70 of FIG. 2 according to one embodiment of the present invention. In the embodiment shown in FIG. 4, the user of either the device 22 or the device 98 desires to send either a digital audio message as an attachment to an electronic mail message to the computer 78 or desires to send a facsimile message to the facsimile device 74. In the embodiment shown in FIG. 4, the device that is used (i.e. either the device 22 or the device 98) does not have the capability to record messages.

At step 400, either the IRS 34 or the gateway 108 receives a call from the device 22 or the device 98 indicating that the user desires to send an electronic mail with an audio attachment or a facsimile. At step 402, the user of the device 22, 98 records the message using the IRS 34 or the gateway 108. Alternatively, the user enters the message as a text message using, for example, a keypad, and the text message may be converted to a digital audio format using, for example, a TTS converter. At step 404, the user is prompted as to whether the message will be sent as an attachment to an electronic mail message or as a facsimile message. If the message is to be sent as an attachment to an electronic mail message, at step 406 the user of the device 22, 98 enters the address for the device to which the message will be sent. The user may enter the address using, for example, a keypad on the device 22, 98 or by speaking the address. At step 408, the electronic mail message is sent via the network 76 by the gateway 108 or by the AIN 10.

If the message is to be sent to the facsimile device 74, the user enters the telephone number of the device 74 using, for example, a keypad on the device 22, 98 or by speaking the telephone number at step 410. At step 412, the message is translated to a text message using an ASR device if it was recorded in digital audio format. At step 414 the facsimile message is delivered to the facsimile device 74 via the AIN 10.

The various methods described herein may be implemented on any type of suitable computer hardware, computer software, or combinations thereof. For example, the methods may be implemented in computer software using any suitable computer software language type such as, for example, C or C++ using, for example, conventional or object-oriented techniques. Such software may be stored on any type of suitable computer-readable medium or media such as, for example, a magnetic or optical storage medium.

While several embodiments of the invention have been described, it should be apparent, however, that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention as defined by the appended claims.

The invention claimed is:

1. A method for sending a message from a telecommunications device to a receiving device, comprising:
   recording the message as an audio file;
   providing a user prompt that includes an option to transmit the audio file as an attachment to an electronic mail message and an option to transmit the audio file as a facsimile message;
   responsive to receiving indication that the message is to be transmitted as an attachment to an electronic mail, message:
      receiving an address of the receiving device; and
      sending the audio file as an attachment to an electronic mail message to the receiving device:
   responsive to receiving indication that the message is to be transmitted as an attachment to a facsimile message:
      receiving an address associated with the receiving device, wherein the receiving device includes a facsimile device;
      converting the audio file into a format associated with the facsimile device; and
      delivering the converted audio file to the facsimile device.

2. The method of claim 1, wherein the telecommunications device is one of a wireline device and a wireless device.

3. The method of claim 1, wherein recording the message as an audio file includes recording the message as an audio file at one of the telecommunications device, a wireless gateway, and a telecommunications network server.

4. The method of claim 1, wherein recording the message as an audio file includes recording spoken language in the audio file.

5. The method of claim 1, wherein recording the message as an audio file includes:
   receiving the message via a text input device; and
   converting the text message to an audio file.

6. The method of claim 1, wherein receiving an address of the receiving device includes receiving a uniform resource locator (URL) address for the receiving device.

7. The method of claim 1, wherein receiving an address of the receiving device includes receiving one of a text message address and a spoken word address.

8. The method of claim 1, wherein sending the audio file as an attachment to an electronic mail message to the receiving device includes sending the electronic mail message via one of a wireless gateway and a wireline telecommunications network.

9. The method of claim 1, wherein the receiving device includes a computer.

10. The method of claim 1, wherein recording the message as an audio file includes recording the message as a digital audio file.

11. A method for sending a message from a telecommunications device to a receiving device, comprising:
   recording the message;
   providing a user prompt that includes an option to transmit the message as an attachment to an electronic mail message and an option to transmit the message as a facsimile message;
   responsive to receiving indication that the message is to be transmitted as facsimile message, receiving a telephone number of the receiving device;
   translating the audio message into text; and
   sending the message as a facsimile message to the receiving device.

12. The method of claim 11, wherein the telecommunications device is one of a wireline device and a wireless device.

13. The method of claim 11, wherein recording the message includes recording the message at one of the telecommunications device, a wireless gateway, and a telecommunications network server.

14. The method of claim 11, wherein recording the message includes recording the message using a text input device.

15. The method of claim 11, wherein recording the message includes recording the message as an audio file.

16. The method of claim 11, wherein receiving a telephone number of the receiving device includes receiving one of a text message telephone number and a spoken word telephone number.

17. The method of claim 11, wherein sending the message as a facsimile message to the receiving device includes sending the message via a wireline telecommunications network.

18. The method of claim 11, wherein the receiving device includes one of a facsimile machine and a computer having a facsimile modem.

19. A user communications device for sending a message to a recipient device comprising:
   logic configured to record a message from a user;
   logic configured to provide a user prompt that includes an option to transmit the message as an attachment to an electronic mail message and an option to transmit the message as a facsimile message;
   logic configured to, in response to receiving an indication that the message is being sent an attachment to an electronic mail message:
      send an electronic mail message with the recorded message attached to the electronic message, wherein the electronic message is directed to an address associated with the recipient device; and
   logic configured to in response to receiving an indication that the message is being sent as a facsimile message:
      receive an address associated with the recipient device, the recipient device including a facsimile device;
      convert the audio file into a format associated with the facsimile device; and
      deliver the converted audio file to the facsimile device.

20. A user communications device for sending a message to a recipient, comprising:
   logic configured to record a message from a user;
   logic configured to provide a user prompt that includes an option to transmit the message as an attachment to an electronic mail message and an option to transmit the message as a facsimile message;
   logic configured to receive a recipient facsimile number associated with a desired facsimile device in response to receiving indication that the message is being sent as a facsimile message;
   logic configured to convert the received message into a format associated with the desired facsimile device; and
   logic configured to send the facsimile message to the desired facsimile device.

21. The user communications device of claim 20, further comprising:
   logic configured to receive a recipient address in response to receiving indication that the message is being sent as an attachment to an electronic mail message; and
   logic configured to send an electronic mail message with the recorded message attached to the electronic message, wherein the electronic message is directed to the recipient address.

* * * * *